April 8, 1958   G. W. MERRITT   2,829,604
TRACKWAY-MOUNTED CAR BUMPER
Filed June 15, 1955   2 Sheets-Sheet 2

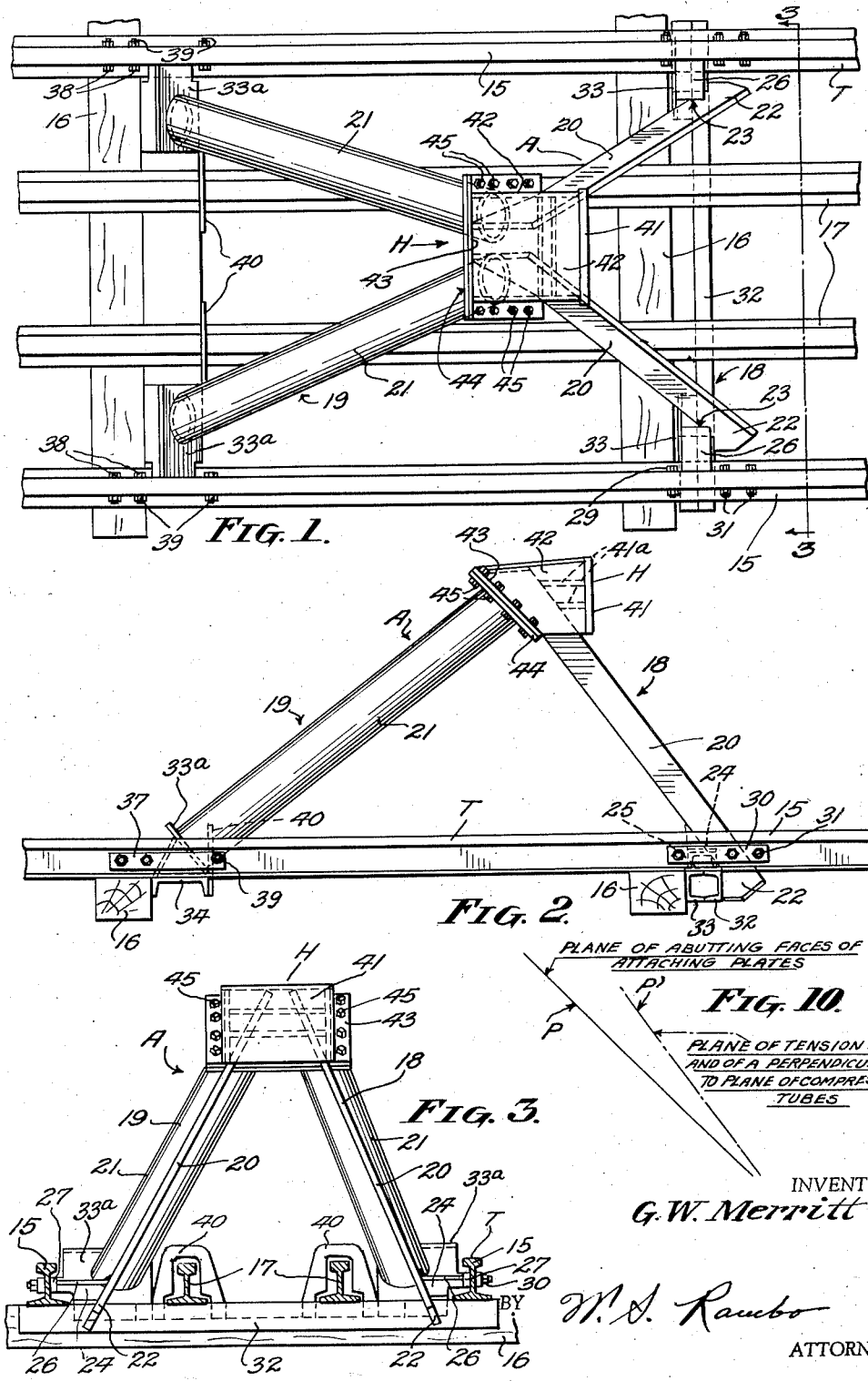

INVENTOR
G. W. Merritt

BY
ATTORNEY

United States Patent Office 2,829,604
Patented Apr. 8, 1958

2,829,604

TRACKWAY-MOUNTED CAR BUMPER

Glenn W. Merritt, Bowerston, Ohio, assignor to The Nolan Company, Bowerston, Ohio, a corporation of Ohio Application June 15, 1955, Serial No. 515,602

4 Claims. (Cl. 104—254)

This invention relates to trackway-mounted car bumpers and has particular reference to bumpers of the type embodying tension and compression sections secured to the rails of an associated trackway and a centrally positioned bumper head carried by and separably uniting the upper portions of said sections.

It is an important object of the present invention to improve the operating characteristics of such bumpers and also to simplify and reduce their cost of manufacture.

Another object is to provide a trackway-mounted bumper wherein stresses and strains developed in its compression and tension sections through contact of track-mounted rolling stock with the head of the bumper are more uniformly distributed, absorbed and localization thereof minimized throughout the several parts of the bumper.

A further object of the invention is to provide a trackway-mounted bumper of this character wherein the tension and compression sections include spaced pairs of upwardly and angularly extending, converging members joined at their upper ends with a centrally disposed bumper head, which is formed to include immediately adjoining, separable, attaching plates, the flat abutting faces of said plates occupying a plane acutely angular to the plane of the upwardly converging members of the tension section and to a plane perpendicular to that of the upwardly converging members of the compression section, whereby to obtain improved stress and strain distribution in the assembly and minimizing shear and other stresses on fastening bolts joining the attaching plates.

An additional object is to provide the compression section of the bumper assembly with upwardly and angularly extending members of tubular formation, and wherein improved trackway carried means are provided for rigid connection with the lower ends of such tubular members to support and maintain the latter in their operative positions.

Other objects and advantages of the present invention will become apparent from the ensuing description in the course of which reference is had to the accompanying drawings, and wherein:

Fig. 1 is a top plan view of a car bumper formed in accordance with the present invention, and disclosing the bumper mounted in its operative position on an associated trackway;

Fig. 2 is a side elevational view of the bumper;

Fig. 3 is a front elevational view of the bumper, and disclosing the car wheel-receiving and the trackway reinforcing rails in vertical transverse section;

Fig. 10 is a diagrammatic view disclosing the acute angularity of the plane of the meeting faces of the tension and compression section attaching plates with respect to the plane of the bars of the tension section, and a plane perpendicular to that occupied by the tubular members of the compression section.

Figure 4:
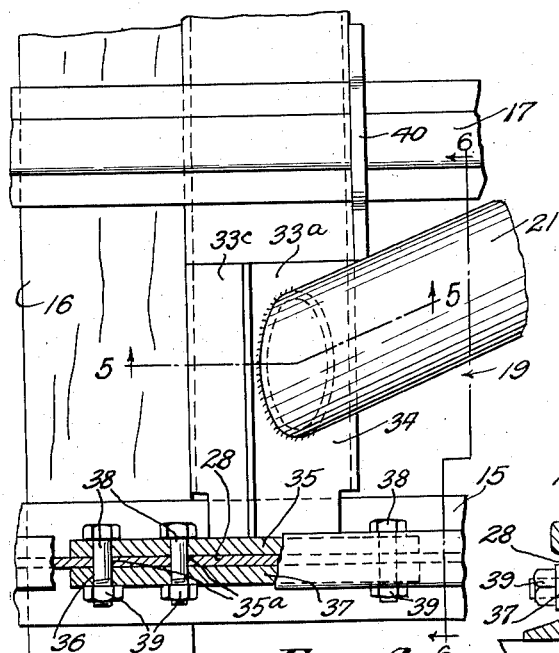
Fig. 4 is an enlarged, fragmentary, top plan view of one of the track-mounted tie-supports for the compression section of the bumper.

In accordance with the present invention, there is provided a bumper assembly A adapted for mounting on a trackway T. The trackway, as here disclosed, comprises a pair of outer car wheel-receiving rails 15 of standard gauge, which are united, as usual, by means of ballast-embedded crossties 16. Also mounted on the ties is a pair of inner, trackway reinforcing, rails 17, the latter extending parallel with and in spaced relation to the outer rails 15 for a limited distance longitudinally of the trackway and adjacent the bumper assembly A.

The bumper assembly is formed to include separably united tension and compression sections 18 and 19, respectively. The forwardly disposed tension section is formed to comprise a pair of relatively spaced, upwardly and rearwardly converging, inclined, tension-receiving bars 20, while the compression section is formed to include a pair of transversely spaced, upwardly and forwardly converging, inclined, compression-receiving tubes 21.

To secure the relatively widely spaced lower ends of the bars 20 to the trackway T, said bars have their lower ends enlarged, as indicated at 22. The lower end of each bar is angularly recessed as at 23 to receive in rigid, welded union therewith the inner end of a laterally and outwardly extending, foot-forming, inverted, channel member 24. The vertical side flanges of each of these members have their lower longitudinally extending edges welded to a horizontally positioned bottom plate 25, and, if desired, the horizontal web of each channel member 24 may be reinforced by having welded thereto a top plate 26.

The outer ends of each channel member 24 and its associated top plate 26 are welded, or otherwise securely joined, with a longitudinally extending plate 27 disposed in contact with the inner face of the vertical web 28 of each outer rail 15. Each plate 27 is formed with a plurality of spaced openings for the reception of the shanks of securing bolts 29 which pass through registering, drilled openings formed in the associated rail web 28 and in complemental plates 30 engaged with the outer surface of the rail web. The threaded shanks of the bolts receive clamping nuts 31.

Figure 7:
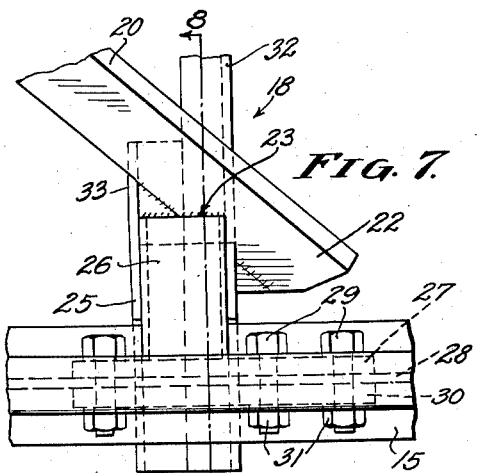
Fig. 7 is a fragmentary top plan view disclosing the union between the lower end of one of the bars of the tension section and its associated trackway mounted tie supports.
Figure 8:
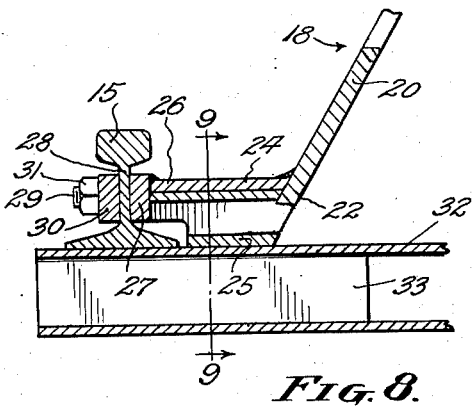
Fig. 8 is a detail, vertical, transverse sectional view on the line 8—8 of Fig. 7.
Figure 9:
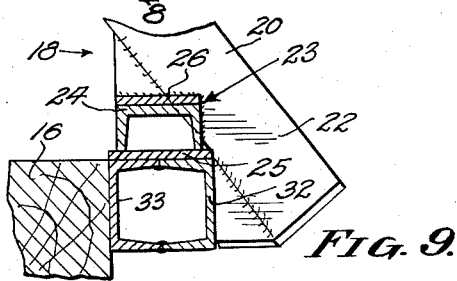
Fig. 9 is a detail, vertical, longitudinal sectional view on the line 9—9 of Fig. 8.

The spacer plates 25 rest on and may be welded to the upwardly positioned side flanges of a pair of opposed long and short channel members 32 and 33, respectively. The adjacent edges of the flanges of these members are welded together, as shown in Figs. 7 and 9, to form a composite, metallic crosstie. The member 32 extends from one side of the trackway T to the other and beneath the rails 15 and 17, while the shorter members 33 merely extend beneath the outer rails 15 and the bar extensions 24 and associated spacer plates 25. Preferably, the short channel members 33, which are joined with the outer portions of the long channel member 32, are arranged to abut a vertical face of an associated wood tie 16, as shown in Fig. 9.

Figure 5:
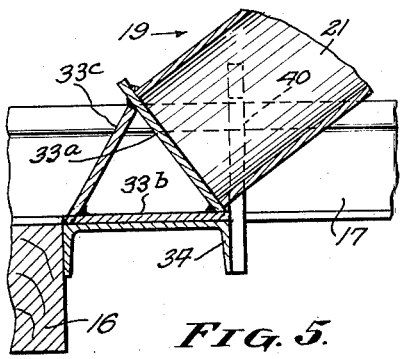
Fig. 5 is a detail vertical, longitudinal sectional view taken through one of the tie-supports and the adjoining lower end of a tube of the compression section of the bumper, the plane of the figure being indicated by the line 5—5 of Fig. 4.
Figure 6:
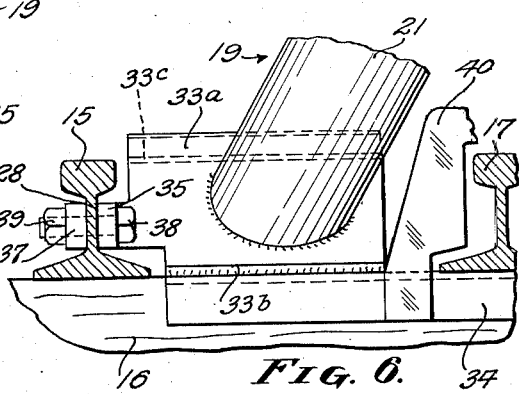
Fig. 6 is a fragmentary front elevational view of the tie support and tube shown in Fig. 5 with associated track rails shown in transverse vertical section, the plane of the figure being indicated by the line 6—6 of Fig. 4.

Similar track-mounted fixtures are provided for securing the lower ends of the tubular compression members 21 to the trackway T. Thus, as shown in Figs. 4 to 6, inclusive, the lower end of each member 21 of the compression section 19 of the bumper assembly, is welded or otherwise rigidly joined with an inclined, horizontally extending, plate structure 33a welded to the upper surface of a flat plate-like pad 33b which, in turn, is welded or otherwise rigidly connected to a metallic crosstie 34, the latter extending transversely between the rails of the trackway from one side thereof to the other. Preferably, the crosstie 34 is in the form of an inverted channel and is positioned immediately adjacent to and in abutting, parallel relation with the vertical front face of an associated wood crosstie 16 of the trackway. The plates 33a are welded to and reinforced by oppositely inclined brace plates 33c which are welded along their lower edges to the pads 33b. Thus, the plates 33a, braces 33c and pads 33b provide triangular shaped boxings to unite the lower ends of the comparison members 21 with the crosstie 34.

The outer ends of the plate structures 33a are welded to fastening plates 35 disposed for engagement with the inner surfaces of the rail webs 28. These plates are formed with openings which are disposed in registry with especially provided openings 35a drilled in the webs 28, and with openings 36 formed in detachable plates 37 engaged with the outer surfaces of the rail webs. These aligned openings are adapted to receive the threaded shanks of securing bolts 38 carrying clamping nuts 39. By these means the compression section 19 of the bumper assembly A may be securely but detachably joined with the elements of the trackway to occupy a definite position with respect thereto, and to enable the trackway to absorb over a considerable length thereof the forces transmitted thereto by the bumper assembly. It will be noted that these track-mounted appliances for the bumper assembly are fabricated from channel beams, bars, tubes, plates and other relatively inexpensive, widely produced steel parts of standardized form. These parts are welded together to form therefrom the desired assembly-forming units, eliminating the need for patterns, castings and the finishing and machining thereof, thus holding manufacturing costs down and reducing weight, but without sacrifice of high strength and rigidity. Upright rail-straddling straps 40 are carried by the metal tie 34 for the reception of the reinforcing rails 17, as shown in Figs. 4 and 6, the straps 40 serving to impart a portion of the compression forces received by the bumping post to the reinforcing rails 17.

An important feature of the present invention resides in the construction and mounting of the bumper head H of the assembly. This head is formed to comprise a boxing including a vertically positioned, forwardly disposed, striking plate 41 mounted above and in substantially the center of the trackway. As a part of the head boxing, employment is made of longitudinally extending side plates 42, which are rigidly welded to the back of the striking plate 41 at their forward ends and to a flat, inclined, attaching plate 43 at their rear edges. A strong, rigid, head boxing is thus produced by these united plates, and this head boxing is carried as a unit upon the upper ends of the tension legs 20, the latter being welded securely to the inner side surface of the attaching plate 43. The head boxing is further reinforced by a pair of horizontally disposed brace plates 41a positioned and welded between the rear face of the striking plate 41 and the forward edges of the tension legs 20. A second, flat, inclined, attaching plate 44 is welded or otherwise rigidly fastened to the upper ends of the compression tubes 21 in abutting relation with the outer and under surface of the complemental, tension section-carried, attaching plate 43.

Along the side edges thereof, the plates 43 and 44 are provided with aligned openings for the reception of fastening bolts 45 having threaded shanks equipped with clamping nuts. By reason of their separateness the sections 18 and 19 may be compactly transported and assembled at the erection location on the trackway. By reference to Figs. 2 and 10, it will be noted that the plane of the interface between the attaching plates 43 and 44, indicated at P in Fig. 10, extends in acute angular relation to the general plane of inclination P' assumed by the tension bars 20 when the sections are joined for use. Also, the plane P is in acute angular relation with a plane normal to the axes of the compression tubes 21. By so inclining or tilting the attaching plates, thrust forces imparted to the bumper head through contact with rolling stock are transmitted to the compression tubes 21 and the tension bars 20 and thence to the elements composing the trackway T for final absorption thereby. In this transmission of thrust forces, the attaching plates, by being angularly disposed as defined, cause the major portion of the resultant thrust forces to act generally downwardly upon the bumping post, to thus be absorbed through the compression section, thereby minimizing tension stresses within the relatively weaker tension members 20.

While a preferred embodiment of the present invention has been shown and described in detail, it should be understood that the details thereof are not intended to be limitative of the invention except insofar as set forth in the appended claims.

I claim:

1. Trackway-mounted car bumper construction, comprising: a pair of separable compression and tension sections; said tension section including upwardly and rearwardly inclined relatively convergent tension members and said compression section including forwardly and upwardly inclined relatively convergent compression members extending toward the members of said tension section, the longitudinal axes of said tension members being disposed in a plane perpendicular to a plane passing through the axes of said compression members and at an acute angle relative to the horizontal; a bumper head disposed between the rails of an associated trackway and rigidly carried by the convergent upper ends of the members of said tension section; said head including a vertically arranged striking plate disposed forwardly of the upper ends of said tension members; an angularly positioned attaching plate arranged rearwardly of said tension members and intermediate plates disposed between and rigidly joined with said striking and attaching plates; an angularly disposed, complemental attaching plate carried by and rigidly joined with the upper ends of the members of said compression section for flat, abutting engagement with the head-carried attaching plate, said attaching plates being formed with marginal bolt-receiving openings; fastening bolts extending through the marginal openings of said attaching plates and rigidly uniting the latter in flat, parallel, abutting order, the plane of the united attaching plates being acutely angular to the plane of inclination of the tension members and being disposed at a lesser acute angle relative to the horizontal than the longitudinal axes of said tension members; and securing means for separably and rigidly uniting the lower portions of said tension and compression sections to the trackway.

2. Car bumper construction as defined in claim 1, and wherein the upwardly and rearwardly convergent tension members of said tension section comprise metallic bars and the upwardly and forwardly convergent members of said compression section comprise metallic tubes of uniform diameter throughout their lengths.

3. Car bumper construction comprising: longitudinally spaced, transversely extending forward and rear base ties; means detachably clamping said ties at their ends to the rails of an associated trackway; separable tension and compression bumper sections; said tension section including a pair of relatively convergent, flat, tension-receiving bars rigidly joined with and extending rearwardly and upwardly from the said forward base tie, the longitudinal axis of said tension-receiving bars lying in a plane acutely angular to the horizontal; a unitary bumper head rigidly and inseparably united with the convergent upper ends of said tension bars; said head including a vertical striking plate disposed forwardly of the upper ends of said bars, a rearwardly disposed inclined attaching plate and a plurality of intermediately disposed longitudinally extending plates rigidly united at their ends with the striking and attaching plates; said compression section including a pair of relatively convergent, forwardly and upwardly inclined members of uniform tubular formation throughout substantially their full lengths, the longitudinal axes of said tubular members being disposed in a plane substantially perpendicular to the plane of said tension bars; seating formations having inclined faces and rigidly secured to the said rear base tie, said faces receiving and having rigidly secured thereto the lower ends of said tubular compression members; plate means rigidly carried by the upper ends of said tubular members, said plate means being disposed in parallel abutting relation to the attaching plate of said bumper head for direct engagement therewith; said plate means and the attaching plate of said bumper head being arranged at an acute angle with respect to the longitudinal axes of said tension-receiving bars and said tubular compression members and at a lesser acute angle with respect to the horizontal than the longitudinal axes of said tension-receiving bars, whereby to cause the major component of forces imparted to said bumper by a railway vehicle striking said striking plate to react in a generally downward direction on said compression members; and bolt means separably uniting the plate means of said compression section with the attachment plate of said head.

4. Trackway-mounted bumper construction comprising: a pair of separable tension and compression sections; said tension section including spaced, upwardly and rearwardly inclined, relatively convergent, tension-receiving bars having longitudinal axes disposed in a plane lying at an acute angle with respect to the horizontal, said compression section including spaced upwardly and forwardly inclined, relatively convergent compression-receiving tubes, the axes of said tubes being disposed in substantially perpendicular relation to the axes of said bars; a rigid, unitary, bumper head carried by and rigidly united with the convergent upper ends of said tension-receiving bars; said head including a forwardly disposed, vertical, striking plate, a rearwardly disposed attaching plate and a plurality of intermediately disposed plates uniting the striking and attaching plates to form a rigid head boxing into which the upper ends of said tension-receiving bars project and are secured; said attaching plate being disposed in acute angular relation to the general plane of inclination of said tension-receiving bars and at a lesser acute angle with respect to the horizontal than said tension-receiving bars; plate means rigidly carried by the upper ends of said compression-receiving tubes, said plate means being disposed in flat, abutting contact with the rear and under surface of the attaching plate of said head; bolt means extending through aligned openings formed in said attaching plate and said plate means for separably uniting said sections in bumper-forming order; transversely extending, longitudinally spaced, front and rear base ties rigidly united, respectively, with the lower ends of said tension-receiving bars and the lower ends of said compression-receiving tubes; and means for detachably uniting the ends of said base ties to the rails of a trackway.

References Cited in the file of this patent
UNITED STATES PATENTS

| | | |
|---|---|---|
| 2,022,767 | Hayes | Dec. 3, 1935 |
| 2,308,877 | Hayes | Jan. 19, 1943 |